United States Patent
Flores et al.

(10) Patent No.: US 6,567,937 B1
(45) Date of Patent: May 20, 2003

(54) TECHNIQUE FOR REMOTE STATE NOTIFICATION AND SOFTWARE FAULT RECOVERY

(75) Inventors: Pablo Flores, Houston, TX (US); Andres Martinez, Houston, TX (US)

(73) Assignee: Isengard Corporation, Katy, TX (US)

( * ) Notice: Subject to any disclaimer, the term of this patent is extended or adjusted under 35 U.S.C. 154(b) by 0 days.

(21) Appl. No.: 09/441,470

(22) Filed: Nov. 17, 1999

(51) Int. Cl.[7] .............................................. G06F 11/30
(52) U.S. Cl. ........................................... 714/46; 714/48
(58) Field of Search .............................. 714/15, 46, 57, 714/4, 38, 47, 48, 26; 709/224; 345/736

(56) References Cited

U.S. PATENT DOCUMENTS

| | | | |
|---|---|---|---|
| 5,715,393 A | * 2/1998 | Naugle | 709/224 |
| 5,748,882 A | * 5/1998 | Huang | 709/224 |
| 5,748,884 A | * 5/1998 | Royce et al. | 714/57 |
| 6,021,262 A | * 2/2000 | Cote et al. | 714/48 |
| 6,065,053 A | * 5/2000 | Nouri et al. | 709/222 |
| 6,094,681 A | * 7/2000 | Shaffer et al. | 709/224 |
| 6,145,101 A | * 11/2000 | Pike | 714/46 |
| 6,349,335 B1 | * 2/2002 | Jenney | 709/224 |

\* cited by examiner

*Primary Examiner*—Scott Baderman
*Assistant Examiner*—Joshua Lohn
(74) *Attorney, Agent, or Firm*—Trop, Pruner & Hu, P.C.

(57) ABSTRACT

A software fault recovery system monitors a software program (application) and, upon determining the application has failed, generates and transmits an alert message to a remote device. The alert message may include a description of the determined fault and one or more possible error recovery actions. The fault recovery system waits to receive a response message and, if it does, initiates that fault recovery action specified in the response message. If a response message is not received within a specified time period, the fault recovery system initiates a default recovery action.

27 Claims, 3 Drawing Sheets

APPLICATION ID: APP-1
PROBLEM: DEAD

RESPONSE OPTION 1: RESTART APPLICATION (DEFAULT)
RESPONSE OPTION 2: RESTART APPLICATION + RESTART HOST COMPUTER 106

MACHINE ID: HOST COMPUTER 106

TECHNIQUE FOR REMOTE STATE NOTIFICATION AND SOFTWARE FAULT RECOVERY

BACKGROUND

The invention relates to software fault recovery techniques and, more particularly but not by way of limitation, to software recovery operations that may be selectively initiated by remotely communicated user input.

Various industries have incorporated and rely on computer programs (applications) to enable round-the-clock business operations. One industry that relies on the continuous operation of computer programs is the packing and shipping industry. In this industry, tracking the 24-hour movement of freight from shipping source to shipping destination (and all intermediate locations) is generally considered vital to the success of a business.

If the programs used to track freight fail, it may be impossible to determine the current location of any given package or piece of freight. Not only does this jeopardize the efficient operation of the shipping company, it may also negatively impact a client's ability to track their freight and, consequently, negatively affect their perception of the shipping company's performance.

In this and similar industries, several software recovery techniques have been developed. One such technique is to redundantly execute mission-critical applications. In this way, if one of the executing applications fails the other may be used, with the failed application being brought back on line as soon as possible. The most common technique, however, relies on an individual being on-duty 24-hours a day to monitor the execution of mission critical applications. In one approach, personnel capable of responding to a software failure are employed to perform the monitoring. In another approach, lesser trained personnel are employed to monitor the application. When an error is detected, these individuals contact a third party who then travel to the business site to troubleshoot and restart the faulty application.

Many organizations may not be able to afford the money or consumption of personnel resources to maintain a 24-hour watch on their computer systems. Thus, it would be beneficial to provide a software fault recovery technique that may be initiated remotely.

SUMMARY

In one embodiment the invention provides a method to remotely, and selectively initiate software fault recovery actions. The method includes determining a state of a process, transmitting an alert message to a remote device if the process in a first state, selectively initiating a fault recovery action in accordance with response signal (received in response to the alert signal), and initiating a default recovery action if the response message is not received within a specified time period. In some embodiments, the alert message and response message are communicated by the same mode (e.g., electronic mail). In other embodiments, the alert and response messages may be transmitted via different modes (e.g., the alert message may be transmitted by electronic mail and the response message may be transmitted by telephone lines using an interactive voice response system). The method may be stored in any media that is readable and executable by a computer system.

DETAILED DESCRIPTION

Techniques (including methods and devices) to provide software fault recovery capability that may be selectively initiated by remotely communicated user input are described. The following specific embodiments of the invention, described in terms of the above-enumerated figures, are illustrative only and are not to be considered limiting in any respect.

Figure 1:
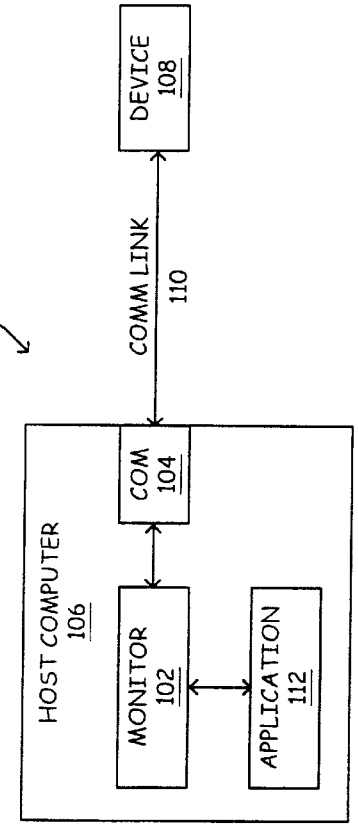
FIG. 1 shows a block diagram of a software fault recovery system in accordance with one embodiment of the invention.

Referring to FIG. 1, software fault recovery system 100 in accordance with one embodiment of the invention includes monitor routine 102 and communication routine 104 to effect two-way communication between host computer 106 and remote device 108 via communication link 110. In general, routine 102 monitors the operational state of application 112 and alerts user 114 (via remote device 108) when application 112 has failed. Use of two-way communication allows user 114 to remotely initiate a fault recovery operation. In some embodiments, monitor routine 102 may encode and transmit multiple fault recovery options to remote device 108, thereby allowing user 114 to selectively initiate one of a plurality of possible software fault recovery actions.

Figure 2:
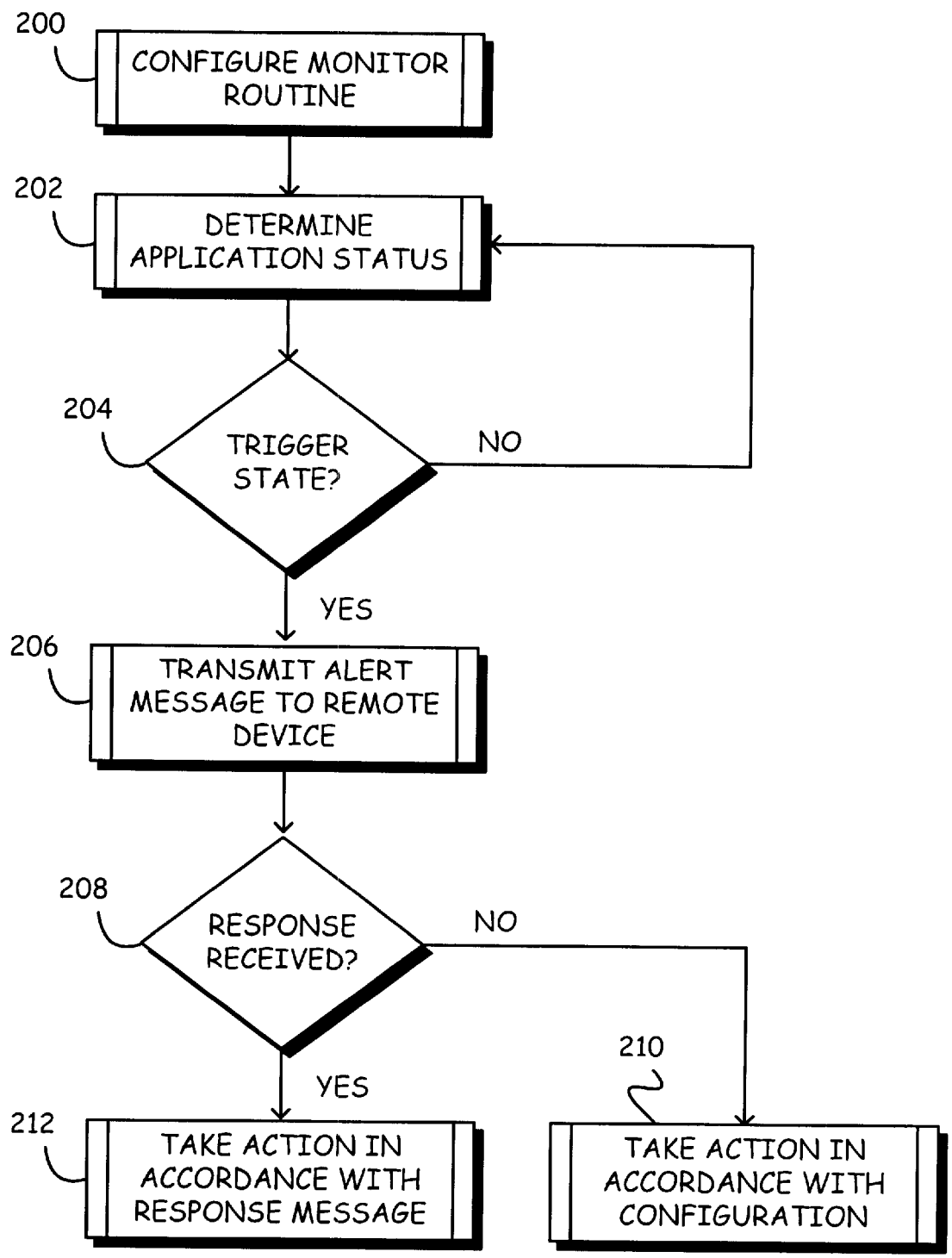
FIG. 2 illustrates, in flow chart form, the operation of a monitor routine in accordance with one embodiment of the invention.
Figures 3, 4:
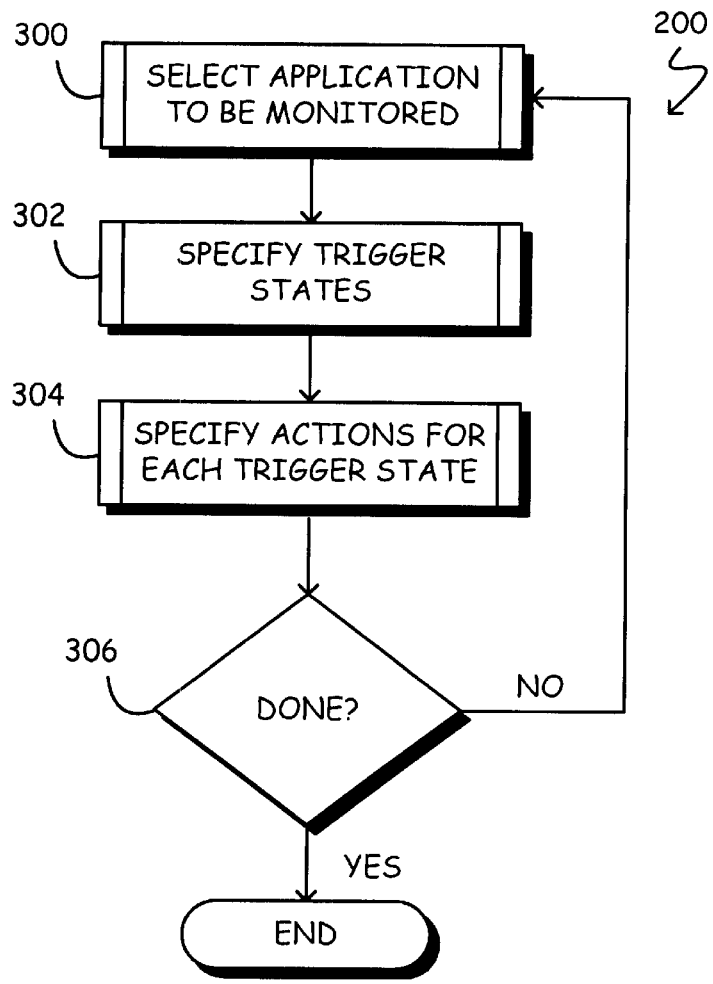
FIG. 3 illustrates, in flow chart form, a monitor routine configuration method in accordance with one embodiment of the invention.
FIG. 4 shows an illustrative text-based alert message in accordance with one embodiment of the invention.

Referring to FIG. 2, operation of monitor routine 102 in accordance with one embodiment of the invention is shown in flow chart form. As a preliminary act, monitor routine 102 is configured (block 200). As shown in FIG. 3, the act of configuring includes selecting an application to be monitore specifying one or more trigger states for which monitor routine 102 should take action (block 302) and specifying the action to be taken for each specified trigger state (304). The acts of blocks 300 through 304 are repeated for each application to be monitored (diamond 306). That is, monitor routine 102 may be configured to monitor one or more application programs.

Selection of applications to be monitored in block 300 may be made in any desired fashion. For example, application selection may be made through a command-line interface, one or more monitor routine 102 initialization files, or a graphical user interface. Trigger states specified in block 302 refer to those operational states of an application that can be determined by monitor routine 102 and which, when they are detected, are to result in an action by monitor routine 102. For example, an executing application may be in a NORMAL state (operating without error), a NON-RESPONSIVE or HUNG state (operating but non-responsive to an external query), or a DEAD state (operationally halted). For example, in a Microsoft Windows® environment, the following WIN32 Application Programming Interface (API) calls may be made to ascertain and modify the state of a process: SendMessageTimeout; OpenProcess; SendMessage; and TerminateProcess. (It will be recognized each of these functions has one or more arguments and that the particular value chosen for these arguments determines the result of executing the functions.)

For each state which monitor routine 102 is to take action (e.g., NON-RESPONSIVE and DEAD), one or more possible fault recovery actions are specified in block 304 and one of the specified actions is designated the "default action." In addition, one or more means of communicating the determined state and the one or more possible fault recovery actions (hereinafter referred to as the "alert message") to remote user 114 (via remote device 108) is also specified during block 304. It will be recognized that each specified communications means will have an associated "address." For example, if the communications means is electronic mail (e-mail), the specified address will be a properly formatted e-mail address and if the communications means is voice, facsimile or pager, the specified address will be a telephone number. In one embodiment, one of the specified means of communication is designated as the "default communications means." In another embodiment, the various communication means may be prioritized, wherein the communication means designated as the top priority is used as a default communications means. Table 1 provides illustrative configuration information (for a specified application) designating trigger actions and associated communication means.

TABLE 1

Illustrative Configuration Information

| State | Action | Communication Means |
| --- | --- | --- |
| NORMAL | None | None |
| NON-RESPONSIVE or HUNG | Restart Application | E-mail; Pager; Voice; Facsimile |
|  | Restart Host Computer & Restart Application |  |
| DEAD | Restart Application | E-mail; Pager; Voice; Facsimile |
|  | Restart Host Computer & Restart Application |  |

† Designates default action or communications means

Although the claimed invention is not so limited, for ease of discussion the remainder of this description will assume a single application is being monitored. Referring again to FIG. 2, during execution monitor routine 102 periodically determines the operational status of the selected application (block 202). In one embodiment, this may be done through standard application programming interface (API) function calls to the underlying operating system or directly to the executing application if supported. In another embodiment, the monitored application itself may periodically generate health status messages (i.e., a "heartbeat" signal) which monitor routine 102 may receive directly or through a system API call.

If the application's determined state does not correspond to a specified trigger state (the "no" prong of diamond 204), processing resumes at block 202. If the application's determined state does correspond to a specified trigger state (the "yes" prong of diamond 204), an alert message encoding the determined state and one or more possible fault recovery actions is generated and transmitted to remote device 108 via one of the specified communication means (block 206). For example, if the specified communications means is e-mail or facsimile, a properly formatted text-based alert message (see FIG. 4) is prepared and transmitted in a conventional manner. Alternatively, if the specified communications means is voice, the information prepared in accordance with an e-mail or facsimile alert message may be converted to speech by a standard text-to-voice device which is then transmitted to remote device 104 via voice communications link 110.

If a response to the alert message sent in block 206 is not received by monitor routine 102 within a specified time period (the "no" prong of diamond 208), that fault recovery action designated as the default action during the acts of blocks 200 and 304 is initiated (block 210). If a response to the alert message is received by monitor routine 102 within the specified time period (the "yes" prong of diamond 208), that fault recovery action specified in the received message (hereinafter the response message) is initiated (block 212). It will be recognized that the amount of time to wait for a response message before initiating the default fault recovery action is dependent upon the application being monitored. For example, if application 112 is a database for tracking ongoing financial transactions, the specified time period may be 5 to 10 minutes. Similarly, if application 112 is part of a shipping companies freight tracking system, the specified delay may be 10 to 15 minutes. Further, the specified time period may vary depending upon the time of day and/or day of week—shorter delay times designated for peak work hours, longer delay times for off-peak hours.

In one embodiment, the response message may be received via the same mode (i.e., communications means) as the alert message was transmitted. In another embodiment, the alert and response messages may use different modes. For example, if the alert message of block 206 is transmitted to a two-way pager (remote device 108), selection of one of the one or more response actions may be selected by user 114 and transmitted (via communications link 110 and communications routine 104) to monitor routine 102—that is, both the alert message and the response message are transmitted using the same mode. Alternatively, if the alert message is transmitted via a two-way pager and the response message is transmitted via a voice communication link, communication routine 104 may support interactive voice response (IVR) input. In yet another embodiment, if the response message is received via e-mail, communication routine 104 may parse the received e-mail message to determine the selected fault recovery action. In still another embodiment, transmission of a response message may be made by user 114 via a web-based application to monitor routine 102. In this implementation, communication routine 104 provides a secure web-page (e.g., via secure sockets layer technology) through which user 114 could select the desired fault recovery action.

Figure 5:
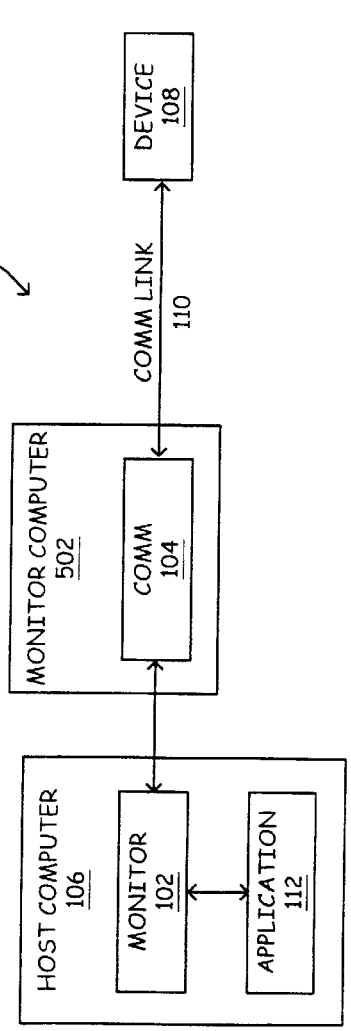
FIG. 5 shows a block diagram of a software fault recovery system in accordance with another embodiment of the invention.

Referring to FIG. 5, software fault recovery system 500 in accordance with another embodiment of the invention includes external monitor computer 502. Use of external monitor computer 502 allows fault recovery system 500 to detect a general failure of host computer system 106 (e.g., operating system fault). Once detected, communication routine 104 may generate an appropriate alert message and transmit the same to remote device 108. Communication between host computer 106 and monitor computer 502 may be by any convenient means. For example, host and monitor computers may be coupled by a computer network using the TCP/IP communication protocol, or serial or parallel communication links.

Benefits of a software fault recovery system in accordance with the invention include the ability to determine which applications are to be monitored, specify one or more error states and possible recovery actions associated with each error state in a manner that may be invoked remotely. In contrast to prior art techniques, the fault recovery system of the present invention allows users to monitor mission-critical applications 24-hour a day without incurring the cost of having a dedicated attendant. Only when an error occurs does a person capable of understanding and responding to the error get contacted, and then that individual may remotely and automatically access the situation, select that response which is most appropriate, and initiate that response without having to travel. The flexibility afforded by the inventive software fault recovery system allows for two-way communication between the monitor routine and a remote device and user over virtually any medium (i.e., mode).

Various changes in the components and illustrated operational methods are possible without departing from the scope of the claims. For instance, the illustrative systems of FIGS. 1 and 5 may be controlled by any desired operating system such as UNIX® or a Microsoft WINDOWS® operating systems. In addition, acts in accordance with FIGS. 2 and 3 may be performed by a programmable computer processor executing instructions organized into a program module (e.g., monitor and communication routines 102 and 104). Storage devices suitable for tangibly embodying program instructions include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true spirit and scope of the invention.

What is claimed is:

1. A fault recovery method for a process executing on a computer system, comprising:
   determining a state of the process;
   transmitting a first signal to a remote device if the process is in a first state indicative of a fault condition;
   initiating a first software fault recovery action to correct the fault condition in accordance with a second signal, the second signal received in response to the first signal; and
   initiating a second software fault recovery action if the second signal is not received within a specified time period.

2. The method of claim 1, wherein the determined state is selected from the group consisting of normal, non-responsive and dead.

3. The method of claim 1, wherein the first state is selected from the group consisting of non-responsive and dead.

4. The method of claim 3, wherein the act of transmitting a first signal comprises transmitting an electronic-mail signal.

5. The method of claim 3, wherein the act of transmitting the first signal comprises transmitting a signal to a wireless device.

6. The method of claim 5, wherein the act of transmitting the signal to a wireless device comprises transmitting a signal to a wireless pager.

7. The method of claim 5, wherein the act of transmitting the signal to a wireless device comprises transmitting a signal to a wireless telephone unit.

8. The method of claim 3, wherein the act of transmitting the first signal comprises establishing a land-line telephone connection.

9. The method of claim 1, wherein the act of transmitting the first signal further comprises encoding an indication of the first state in the transmitted signal.

10. The method of claim 9, wherein the act of transmitting the first signal further comprises encoding an indication of one or more software fault recovery actions that may be initiated in response to the first state.

11. The method of claim 10, wherein the act of encoding an indication of one or more software fault recovery actions that may be initiated in response to the first state comprises encoding an action selected from the group consisting of restarting the process, restarting the computer system, and restarting the computer system followed by restarting the process.

12. The method of claim 1, wherein the second signal is received by the same mode as the first signal was transmitted.

13. The method of claim 12, wherein the act of initiating a second software fault recovery action comprises an action selected from the group consisting of restarting the process, restarting the computer system and restarting the computer system followed by restarting the process.

14. The method of claim 1, wherein the act of initiating the second software fault recovery action occurs after a specified time period greater than approximately 10 minutes.

15. The method of claim 1, wherein the second software fault recovery action comprises an action to correct the fault condition.

16. A program storage device, readable by a computer processor, comprising:
   instructions stored on the program storage device for causing the computer processor to
   determine a state of a process executing on the computer processor;
   transmit a first signal to a remote device if the process is in a first state indicative of a fault condition;
   initiate a first software fault recovery action to correct the fault condition in accordance with a second signal, the second signal received in response to the first signal; and
   initiate a second software fault recovery action if the second signal is not received within a specified time period.

17. The program storage device of claim 16, wherein the instructions to transmit the first signal comprise instructions to transmit an electronic-mail signal.

18. The program storage device of claim 16, wherein the instructions to transmit the first signal comprise instructions to transmit a signal to a wireless device.

19. The program storage device of claim 16, wherein the instructions to transmit the first signal further comprise instructions to encode an indication of the first state in the transmitted signal.

20. The program storage device of claim 19, wherein the instructions to transmit the first signal further comprise instructions to encode indications of one or more software fault recovery actions that may be initiated in response to the first state.

21. The program storage device of claim 16, wherein the instructions to initiate the second software fault recovery action occurs after a specified time period greater than approximately 10 minutes.

22. The program storage device of claim 16, wherein the second software fault recovery action comprises an action to correct the fault condition.

23. A software fault recovery system, comprising:
   a computer processor; and
   a storage device operatively coupled to the computer processor and adapted to store an application program and a monitor program, said monitor program having instructions for causing the computer processor to determine a state of a process executing on the computer processor, transmit a first signal to a remote device if the process is in a first state indicative of a fault condition, initiate a first software fault recovery action to correct the fault condition in accordance with a second signal, the second signal received in response to the first signal, and initiate a second software fault recovery if the second signal is not received within a specified time period.

24. The system of claim 23, wherein the second software fault recovery action comprises an action to correct the fault condition.

25. A fault recovery method for a process executing on a computer system, comprising:

determining a state of the process;

automatically transmitting a first signal to a remote device in response to the process being in a first state indicative of a fault condition;

automatically initiating a first software fault recovery action to correct the fault condition in response to a second signal, the second signal received in response to the first signal; and automatically initiating a second software fault recovery action to correct the fault condition in response to the second signal not being received within a specified time period.

26. An article comprising a program storage device storing instructions readable by a processor to cause the processor to:

determine a state of a process executing on the processor;

automatically transmit a first signal to a remote device in response to the process being in a first state indicative of a fault condition;

automatically initiate a first software fault recovery action to correct the fault condition in response to a second signal, the second signal being received in response to the first signal; and automatically initiate a second software fault recovery action to correct the fault condition in response to the second signal not being received within a specified time period.

27. A software fault recovery system, comprising:

a computer processor; and a storage device operatively coupled to the computer processor and adapted to store an application program and a monitor program, said monitor program having instructions for causing the computer processor to determine a state of a process executing on the computer processor, automatically transmit a first signal to a remote device in response to the process being in a first state indicative of a fault condition, automatically initiate a first software fault recovery action to correct the fault condition in response to a second signal, the second signal being received in response to the first signal, and automatically initiate a second software fault recovery to correct the fault condition in response to the second signal not being received within a specified time period.

* * * * *